United States Patent
Zaidi et al.

(10) Patent No.: US 9,491,171 B2
(45) Date of Patent: Nov. 8, 2016

(54) SYSTEM AND METHOD FOR VASCULAR MAPPING AUTHENTICATION

(71) Applicant: iAccess Technologies Inc., Santa Ana, CA (US)

(72) Inventors: Syed Jauher Abbas Zaidi, Fallbrook, CA (US); Hasan Ibrahim Ramlaoui, Fullerton, CA (US)

(73) Assignee: iAccess Technologies Inc., Santa Ana, CA (US)

( * ) Notice: Subject to any disclaimer, the term of this patent is extended or adjusted under 35 U.S.C. 154(b) by 16 days.

(21) Appl. No.: 14/689,006

(22) Filed: Apr. 16, 2015

(65) Prior Publication Data

US 2015/0304322 A1    Oct. 22, 2015

Related U.S. Application Data

(60) Provisional application No. 61/980,400, filed on Apr. 16, 2014.

(51) Int. Cl.
*G06K 9/00* (2006.01)
*H04L 29/06* (2006.01)
*H04W 12/06* (2009.01)

(52) U.S. Cl.
CPC ....... *H04L 63/0861* (2013.01); *G06K 9/00892* (2013.01); *H04W 12/06* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 8,166,523 B2* | 4/2012 | Ezaki | ...... | G06F 21/32 380/247 |
| 8,555,334 B2* | 10/2013 | Asano | ...... | G06Q 20/4014 726/2 |
| 8,948,464 B2* | 2/2015 | Hama | ...... | A61B 5/117 382/115 |
| 8,994,498 B2* | 3/2015 | Agrafioti | ...... | G06F 21/40 340/5.52 |
| 2008/0209226 A1* | 8/2008 | Venkatesan | ...... | H04L 9/3231 713/186 |
| 2009/0110249 A1* | 4/2009 | Miura | ...... | G06K 9/00006 382/124 |
| 2010/0253471 A1* | 10/2010 | Abe | ...... | G06F 21/32 340/5.83 |
| 2014/0086459 A1* | 3/2014 | Pan | ...... | G06K 9/00006 382/124 |
| 2014/0089673 A1* | 3/2014 | Luna | ...... | H04L 63/0861 713/186 |
| 2014/0294251 A1* | 10/2014 | Jo | ...... | G06K 9/00885 382/115 |

OTHER PUBLICATIONS

Computer english translation of PCT/JP2011/079100 (WO/2013/088566), pp. 1-11.*

* cited by examiner

*Primary Examiner* — Daniel Mariam
(74) *Attorney, Agent, or Firm* — Sheppard Mullin Richter & Hampton LLP

(57) ABSTRACT

A biometric authentication system includes a biometric device and a security authentication device, wherein the biometric device includes a digital image sensor configured to capture one or more images of human vasculature and a wireless transmitter configured to transmit the one or more images to the security authentication device, and the security authentication device is configured to return an authentication true message if a first vascular map retrieved from a database matches a second vascular map generated from the set of images.

16 Claims, 15 Drawing Sheets

SYSTEM AND METHOD FOR VASCULAR MAPPING AUTHENTICATION

CROSS-REFERENCE TO RELATED APPLICATIONS

This application claims the benefit of and priority to U.S. Provisional Patent Application Ser. No. 61/980,400 filed on Apr. 16, 2014, the contents of which are incorporated herein by reference in their entirety.

TECHNICAL FIELD

The present disclosure is directed towards biometric authentication systems, and more specifically, towards vascular mapping authentication systems and methods.

BACKGROUND

The volume and breadth of electronically stored data on the Internet has brought significant attention to enhancing security mechanisms. In particular, the sophistication and motivation of data thieves and hackers increases as more electronic data is made available. Moreover, electronic networked security systems have become increasingly popular for use in the protection of physical objects, including cars and buildings. Thus, hackers and thieves continue to pursue vulnerabilities in these electronic networked security systems to gain access to electronically stored data, as well as physical access to cars, buildings, and other physical objects. As the hackers and thieves become more sophisticated, so have electronic security systems. Simple password authentication mechanisms have been replaced by stronger password authentication systems, electronic security identification chips, and biometric authentication techniques.

Traditional biometric authentication techniques have focused on fingerprint, retinal scans, and face recognition. However, many of these protocols have been unreliable, and thus, alternative authentication techniques—such as a standard strong password—are typically used in conjunction with biometric authentication techniques. In addition, fingerprint, retinal scan, and face recognition, when used as a singular authentication technique or in conjunction with a password, may still be vulnerable to attack using replicated images of a fingerprint, retina, or face. Further, increasing the level of security for these available biometric systems increases their costs and decreases their ease of use and efficiency to users, making them less desirable. Thus, as the sophistication of hackers and thieves increases, so too does the vulnerability, cost, and complexity of available biometric authentication systems.

BRIEF SUMMARY OF EMBODIMENTS

Biometric authentication systems rely on individually unique aspects of human anatomy, such that there is an extremely low probability that a particular pattern present from a first individual's anatomic feature would ever match a similarly situation pattern present from a second individual's anatomic feature. For example, fingerprint authentication relies on the principle that no two humans have the same fingerprints; retinal authentication relies on the principle that no two humans have the same retinal patterns; and face recognition authentication relies on the principle that no two humans have the same facial patterns. Other biometric authentication systems, such as voice print authentication, rely on the same uniqueness principles. Accordingly, in any one of these authentication systems, a stored image from a user may be compared with a live image from that same user using known pattern recognition algorithms and, if the patterns match, then the authentication system will authenticate the user.

The present disclosure is directed towards biometric authentication, and in particular, a system and method for vascular mapping authentication. Similar to the types of biometric authentication utilized in the aforementioned biometric authentication systems, no two humans have the same vasculature pattern. Moreover, human vasculature that lies just below the surface of the skin (such as that illustrated in FIG. 11) may be imaged using digital imaging technology. In particular, infrared wavelengths carry more heat than visible and ultraviolet wavelengths, and are thus capable of imaging subcutaneous human vasculature due to the warm human blood flowing through that vasculature. Moreover, many digital imaging chips are sensitive to near infrared wavelengths (for example, between 700 nm and 900 nm), which is a good wavelength range for imaging subcutaneous human vasculature. Adding infrared light emitting diodes (LED) flashes can further enhance such images.

Accordingly, using the same biometric authentication principles described above, live images of human vasculature may be captured and mapped using digital image processing to create a digital imaging map. Those images may then be sent to a mobile device or server using wireless technology where they can be compared with stored vascular maps from known users. If the live vascular map matches the stored vascular map, then the system can authenticate the user. In many examples, the disclosed mobile device and digital camera are combined on a single wearable object, such as a wristband, ankle band, arm band, headband, necklace, or other wearable article.

BRIEF DESCRIPTION OF DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
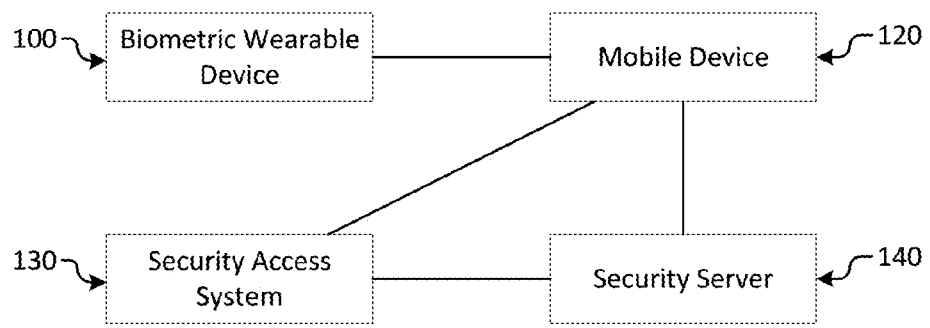
FIG. 1 is a block diagram illustrating a biometric wearable device authentication system consistent with embodiments disclosed herein.

The figures are not intended to be exhaustive or to limit the disclosure to the precise form disclosed. It should be understood that the disclosure can be practiced with modification and alteration, and that the disclosure can be limited only by the claims and the equivalents thereof.

DETAILED DESCRIPTION

Some embodiments of the disclosure provide a system for vascular mapping authentication. In some examples, a system for vascular mapping authentication includes a biometric device, a mobile device, and a security access system. The biometric device may include a digital camera configured to capture live digital images of a user's vasculature through a layer of skin and send the live images to the mobile device. The mobile device may be configured to retrieve stored images for the user's vasculature and compare the stored images with the live images using a pattern matching engine (e.g., a computer processor that include non-transitory computer readable media with a pattern matching algorithm programmed thereon, configured to receive to sets of image data, compare the two sets of image data, and return a probability that the two sets of image data match). In some embodiments, the pattern matching engine may return a probability (e.g., in the form of a match probability score) that two sets of images (e.g., a live vascular map and a stored vascular map) match. If the probability exceeds a threshold value, then the pattern matching engine may determine that the two sets of images, patterns, or vascular maps, match. If the patterns in the stored and live images match, an authentication true signal is sent to the security access system. The security access system is configured to authenticate the user upon receiving the authentication true signal. In some embodiments, the biometric device is a wearable biometric device. However, the biometric device may be either a wearable or a non-wearable biometric device. For example, a non-wearable biometric device may be located in a structure (e.g. a door frame near a door lock controlled by the vascular mapping authentication system). Alternatively, the biometric device may be a computer peripheral device, or a hand-held or portable device. Other physical configurations for a biometric device, either wearable or non-wearable, are possible as would be known in the art.

In some examples, a system for vascular mapping authentication includes a biometric device and a security authentication device. The biometric device may include a digital image sensor and a wireless transmitter. The digital image sensor may be configured to capture one or more images of human vasculature and the wireless transmitter may be configured to transmit the one or more images to the security authentication device. In some examples, the security authentication device is configured to retrieve a first vascular map from a database, generate a second vascular map from the set of images, and compare the first vascular map with the second vascular map using a pattern matching engine. The security authentication device may be further configured to transmit an authentication true signal if the patterns matching engine determines that the patterns match.

In some examples, a method for biometric authentication includes acquiring, with a biometric sensor, one or more images of a cutaneous surface, retrieving a first vascular map from a database, and generating a second vascular map from the set of images. The method may also include generating, with a pattern matching engine, a match probability score based on the probability that the first vascular map matches the second vascular map and returning an authentication true signal if the matching probability score exceeds a threshold value.

Some embodiments disclosed herein are directed at an enhanced biometric authentication method. For example, enhanced biometric authentication may include two or more authentication mechanisms used in conjunction. In some examples, the method includes acquiring, with a biometric sensor, one or more images of a cutaneous surface, retrieving a first vascular map from a database, and generating a second vascular map from the set of images. The method may also include generating, with a pattern matching engine, a match probability score based on the probability that the first vascular map matches the second vascular map. The method may also include applying a second authentication mechanism, such as an unique motion identification, skin texture mapping, retinal scanning, GPS location, voice print recognition, password authentication, or smart device unique identification, and returning a second authentication mechanism true signal if the second authentication mechanism is successful. The method may also include returning an enhanced authentication true signal if the matching probability score exceeds a threshold value and the second authentication true signal is returned.

FIG. 1 illustrates an example biometric wearable device authentication system. An example biometric wearable device authentication system includes biometric wearable device 100, mobile device 120, security access system 130, and optional security server 140. For example, the mobile device may be a security authentication device, or may relay image data to a security server. Biometric wearable device 100 is configured to be wearable on a user wrist, ankle, head, neck, or other body part where human vasculature near the surface of human skin is exposed/visible underneath biometric wearable device 100. Biometric wearable device 100 may be configured to capture or receive live digital images of the human vasculature near the surface of the human skin and transmit the live digital images to mobile device 120. In accordance with one embodiment, these live digital images may be captured using a digital imaging chip that is sensitive to infrared wavelengths to detect the warmer blood within the vasculature beneath the human skin. In accordance with other embodiments, the digital imaging chip is sensitive to near infrared (NIR) wavelengths (for example, wavelengths between 700 nm and 900 nm).

Still referring to FIG. 1, transmission of the live digital images may be accomplished using wireless communication protocols such as Bluetooth®, Wi-Fi, 3G/4G, or other known wireless data transmission protocols. Mobile device 120 may receive and process the live digital images to create a live vascular map. Alternatively, mobile device 102 may relay the live digital images using wireless communication protocols to security server 140, and security server 140 may process the live digital images to create a live vascular map. In this example, the security server, and not the mobile device, acts as the security authentication device.

The live vascular map creation process may be accomplished through known image-to-pattern creation algorithms and may result in a vascular map with a predetermined number of match points. For example, a vascular map may have between 10 and 100 pre-determined match points. Either mobile device 120 or security server 140 may then retrieve one or more stored vascular map patterns associated with a particular user and cause a pattern matching engine to compare the live pattern with the one or more stored patterns to determine if a threshold number of match points are the same in each pattern. If the threshold number of match points are the same, then either mobile device 120 or security server 140 may return an authentication true signal to security access system 130. Security server 140 may be a server application configured to operate from a central server, a personal computer, a laptop, another mobile device, or other computer platforms as would be known in the art.

Still referring to FIG. 1, security access system 130 may be a physical security system such as a commercial or residential alarm system, a door lock, a safe lock, an automobile lock or ignition system, or other physical security systems as would be known in the art. Alternatively, security access system 130 may be a data security system such as a computer or mobile device login authentication system, an Internet authentication, a bank account authentication system, a website authentication system, a data file authentication system, or any other data protection authentication system as would be known in the art.

Figures 2A, 2B:
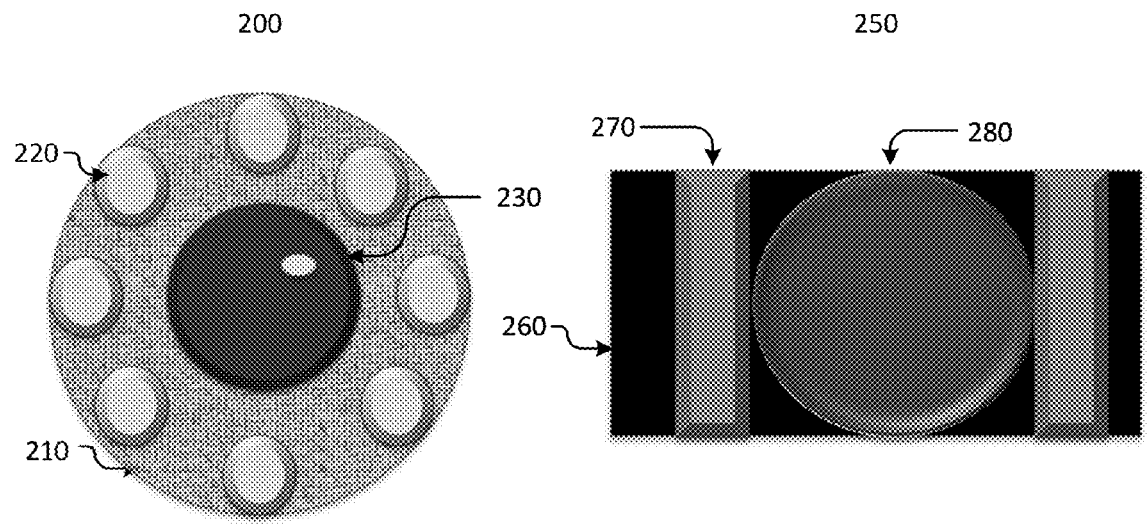
FIG. 2A illustrates an example digital camera with an LED flash system for use with an example wearable biometric device.
FIG. 2B illustrates another example digital camera with an LED flash system for use with an example wearable biometric device.

FIG. 2A illustrates an example digital camera 200 with an electromagnetic illumination device (e.g., an LED flash system) for use with an example biometric wearable device. The example digital camera illustrated in FIG. 2A includes an optical system 230, a mount 210, and a set of LED's 220 arranged in a circular pattern, and a digital imaging chip (not shown). It would be appreciated by one of ordinary skill in the art that the LED flash system could be any electromagnetic radiation device (e.g., light bulbs, laser diodes, fluorescent light bulbs, bioluminescent light sources, etc.) Viewed from the top, as illustrated in FIG. 2A, the digit imaging chip would be located underneath optical system 230. LED's 220 may be designed to illuminate the target (for example, human skin on a particular part of the human anatomy, such as a wrist, hand, neck, forehead, ankle, or other body part or area having complex vasculature) with an optimal wavelength of electromagnetic radiation (e.g., light). In several examples, LEDs 220 are configured to emit infrared electromagnetic radiation. In some examples, LEDs 220 may be NIR LEDs, which may emit light between 700 nm and 900 nm, such as between 760 nm and 780 nm. The digital imaging chip may be configured to be sensitive to the wavelength of electromagnetic radiation emitted by LEDs 220. In some embodiments, digital imaging chips with a resolution between 1.3 mega pixels to 5 mega pixels may be used. In several embodiments, digital imaging chips with power requirements of 1.3V to 3.3V may be used.

FIG. 2B illustrates another example digital camera 250 with an LED flash system for use with an example wearable biometric device. Digital camera 250 includes an optical system 280, a mount 260, and a set of LED's 270 arranged with one rectangular prism-shaped LED on either side of optical system 280, and a digital imaging chip (not shown). In this top down illustration, the digital imaging chip would be directly underneath optical system 280. LED's 270 may be designed to illuminate the target (for example, human skin on a particular part of the human anatomy, such as a wrist, hand, neck, forehead, ankle, or other part with complex vasculature) with an optimal wavelength of light. In several examples, the LEDs are configured to emit infrared light. In some examples, the LEDs may be NIR LEDs. The digital imaging chip may be configured similarly to the digital imaging chip described above and included in digital camera 200.

Referring to both FIGS. 2A and 2B, the digital cameras shown are illustrative of the embodiments disclosed herein. However, other optical systems, digital imaging chips, and LED configurations may be used as would be known to one of skill in the art.

Figure 3:
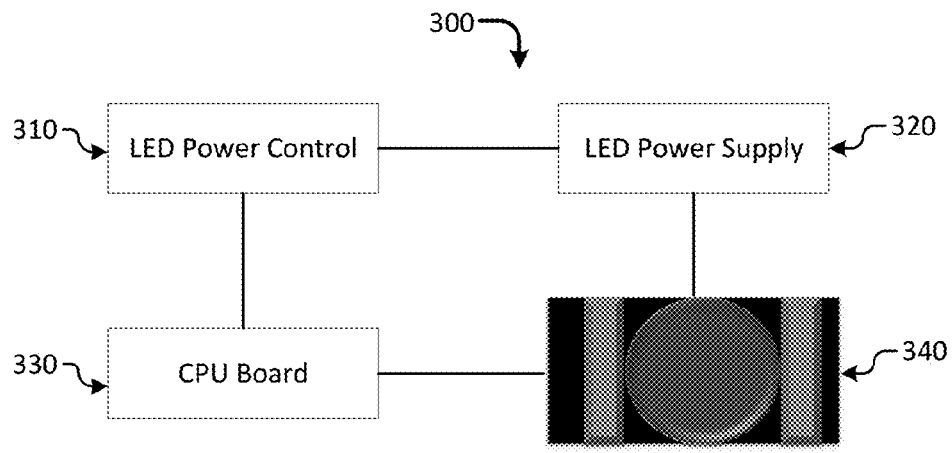
FIG. 3 is a block diagram illustrating a digital camera system consistent with embodiments disclosed herein.

FIG. 3 is a block diagram illustrating a digital camera system 300 consistent with embodiments disclosed herein. Referring to FIG. 3, digital camera 340 includes a digital imaging chip and an LED flash system. Digital camera 340 may be electrically coupled to LED power supply 320 and CPU board 330. CPU board 330 and LED power supply 320 may each be electrically coupled to LED power control 310. CPU board 330 may then control and coordinate the timing of digital image capture by digital camera 340 and the flash of light caused by providing power to the LEDs in digital camera 340 from LED power control 310 and LED power supply 320. Digital camera 340 may also include a wireless communication chip to transmit digital image data via wireless data transmission protocols such as Bluetooth®, Wi-Fi, 3G/4G, or other known wireless communication protocols as would be known in the art.

Figure 4:
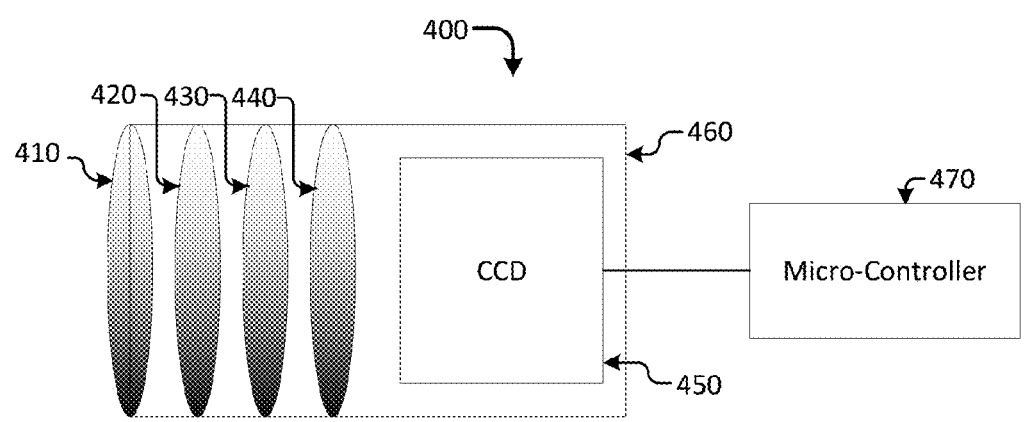
FIG. 4 illustrates an example digital camera system with optical components consistent with embodiments disclosed herein.
Figure 11:
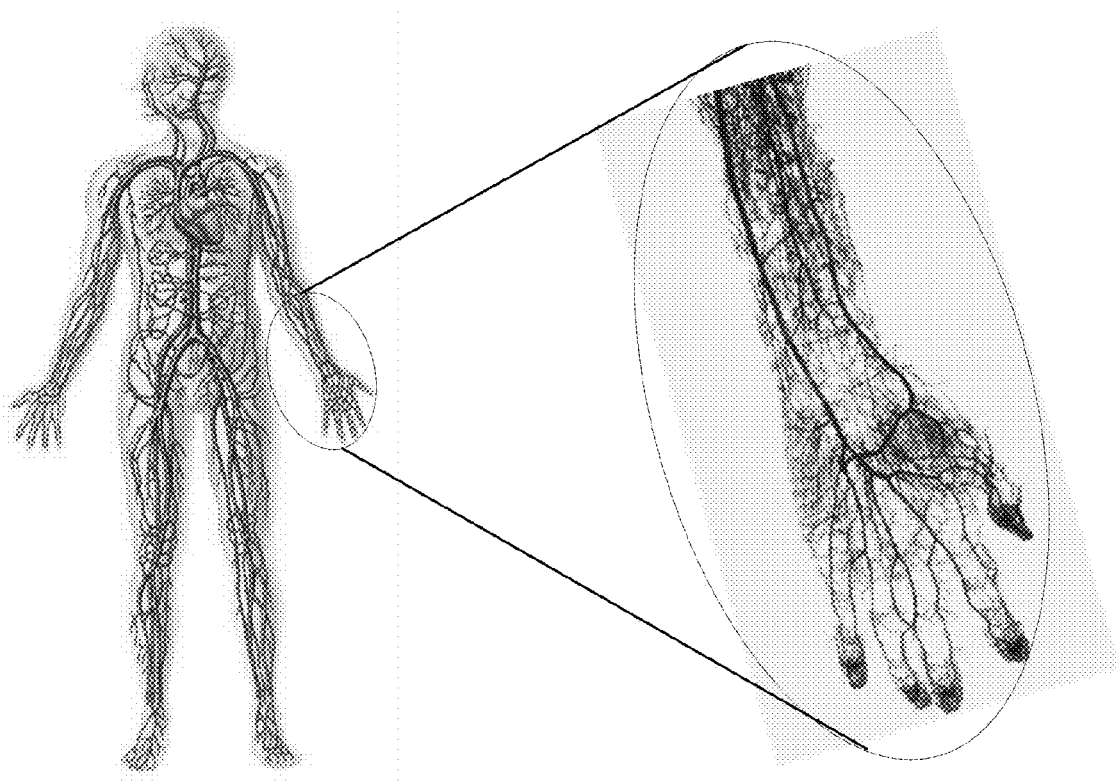
FIG. 11 illustrates an example full body human vasculature map with a blow up detail of a wrist and hand section of the human vasculature map.

FIG. 4 illustrates an example digital camera having optical components consistent with embodiments disclosed herein. Referring to FIG. 4, a digital camera 400 may include a set of filters 410 and 420, a set of lenses 430 and 440, a digital imaging chip 450, a housing 460 and a micro-controller 470. In some examples, filters 410 and 420 may be ultraviolet filters or polarizing filters. In one embodiment, lens 440 is a small focal point lens. In several examples, digital imaging chip 450 is a CCD and/or CMOS sensor, and may be specifically sensitive to NIR wavelengths. Micro-controller 470 may be electrically or wirelessly coupled to digital imaging chip 450 and may control the image capture timing, power to the chip, image processing, and/or wireless transmission of images via wireless data transmission protocols. Digital camera 400 is configured to capture images of a target at, or just under the surface of human skin, and is specifically tuned to detect human vasculature using NIR wavelengths of light to optically detect heat signatures from blood within the human vasculature. In some embodiments, digital imaging chip 450 may be configured to detect variances in wavelength sufficient to indicate changes in the oxygenation of blood, and thus, digital camera 400 may be used as a pulse oximeter to detect changes in blood oxygenation over time to calculate a pulse or heart rate. other examples, the difference in blood oxygenation, as detected by digital camera 400, may be used to distinguish the pre-oxygenated blood in the venous system from the post oxygenated blood in the arterial system, and thus may further distinguish a vascular pattern by adding a blood vessel type to each match point. Differences in arterial and venous vascular maps are illustrated in FIG. 11.

Figure 5:
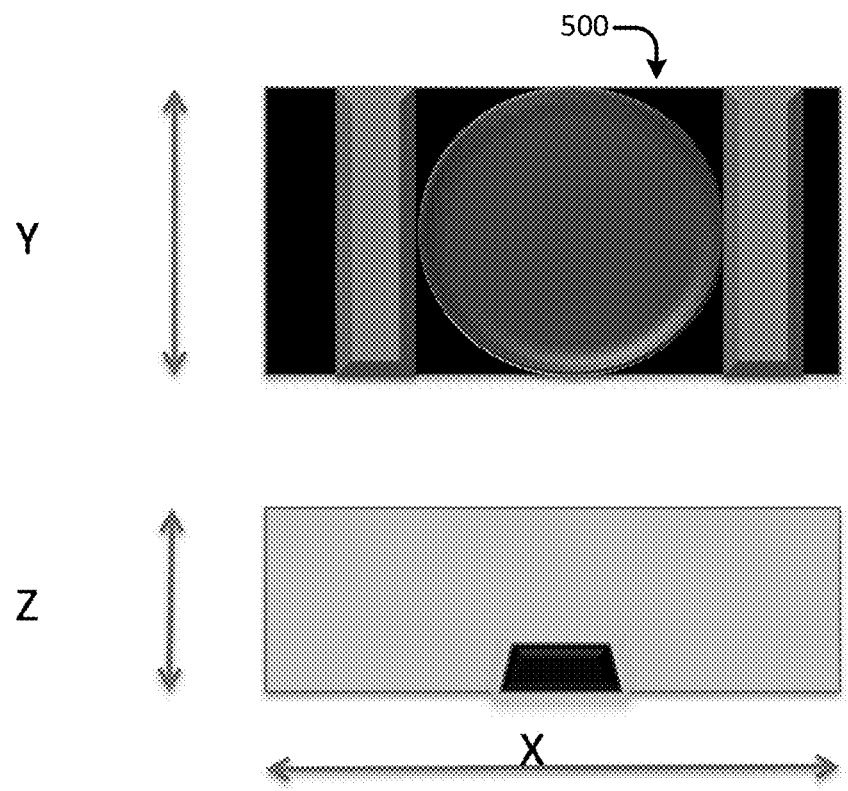
FIG. 5 illustrates a top down view and a side view of an example digital camera with an LED flash system consistent with embodiments disclosed herein.

FIG. 5 illustrates a top view and a side view of an example digital camera 500 with an LED flash system consistent with embodiments disclosed herein. In some embodiments, digital camera 500 is sufficiently small to be worn on a wristband, headband, necklace, or ankle band. Referring to FIG. 5, in some examples, Y may be between 0.5" and 1.5", Z may be less than 0.5", and X may be between 1" and 2". In one example, Y is 1", Z is 0.25", and X is 1.5". In other examples, dimensions X, Y, and Z may vary relative to particular human anatomy the wearable device over which the wearable device is being worn. For example, if worn as a necklace, dimensions X, Y, and Z may be smaller to be less conspicuous. Dimensions X, Y, and Z may be as small as practically possible to accommodate digital camera 500, and may be as large as practical to be worn in a desired configuration.

Figure 6:
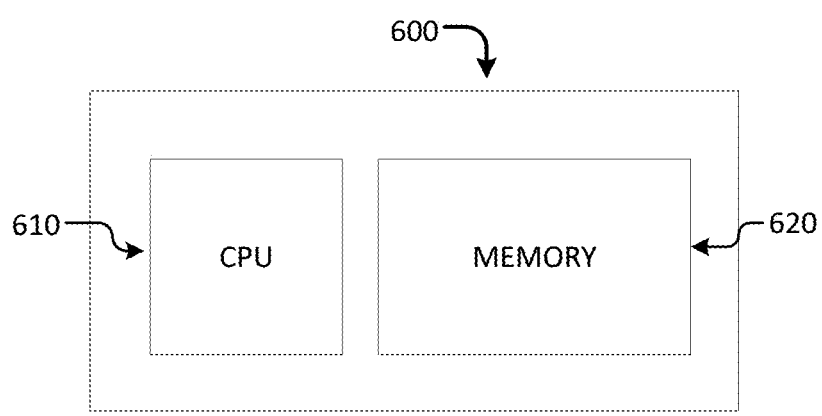
FIG. 6 is a block diagram of an example processing unit for use with an example digital camera consistent with embodiments disclosed herein.

FIG. 6 is a block diagram of an example processing unit, or micro-controller, for use with an example digital camera consistent with embodiments disclosed herein. In some embodiments, processing unit 600 includes a CPU 610 and memory 620. CPU 610 may be configured to control capture of and receive image data from the digital camera, may process the image data to calculate a vascular map, and may store the vascular map in memory 620. In some examples, CPU 610 also may retrieve stored vascular map data from memory 620 and compare to live vascular map data using pattern matching algorithms, and may further determine if a sufficient threshold of match points are registered between the live and stored vascular pattern to determine that the live vascular map is from the same user as the stored vascular map. Processing unit 600 may also be configured with a wireless communication chip to wirelessly transmit image and vascular map data via known wireless communication protocols.

Figure 7:
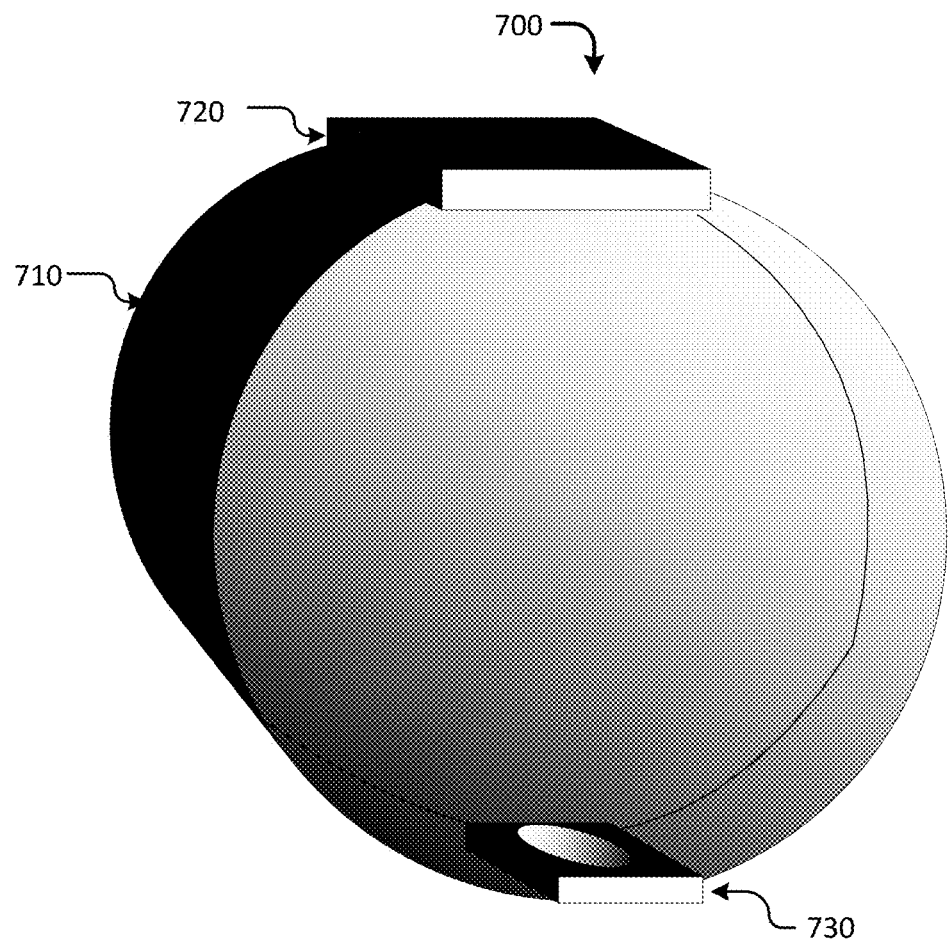
FIG. 7 illustrates a wearable biometric authentication device consistent with embodiments disclosed herein.
Figure 8B:
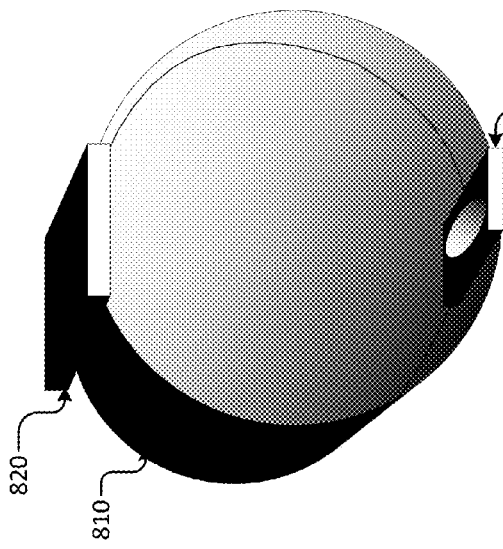
FIG. 8B illustrates a wearable biometric authentication device in another example orientation consistent with embodiments disclosed herein.
Figure 8D:
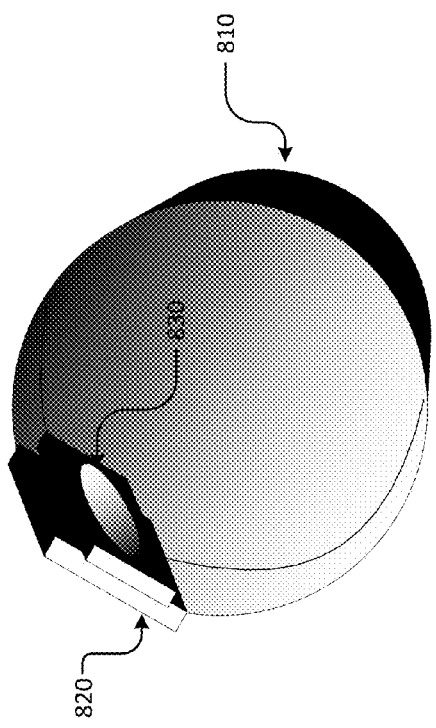
FIG. 8D illustrates a wearable biometric authentication device in another example orientation consistent with embodiments disclosed herein.
Figure 8A:
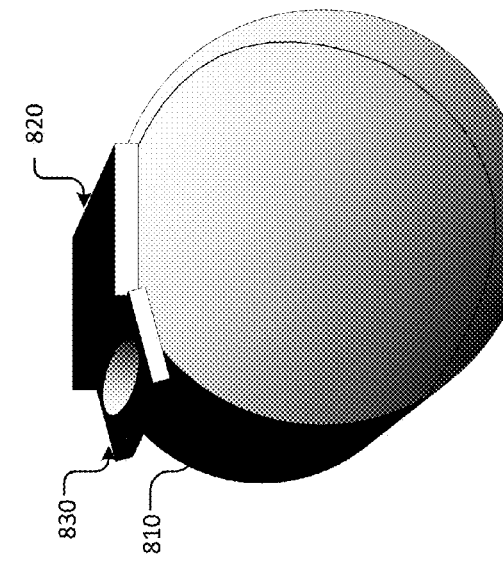
FIG. 8A illustrates a wearable biometric authentication device in an example orientation consistent with embodiments disclosed herein.
Figure 8C:
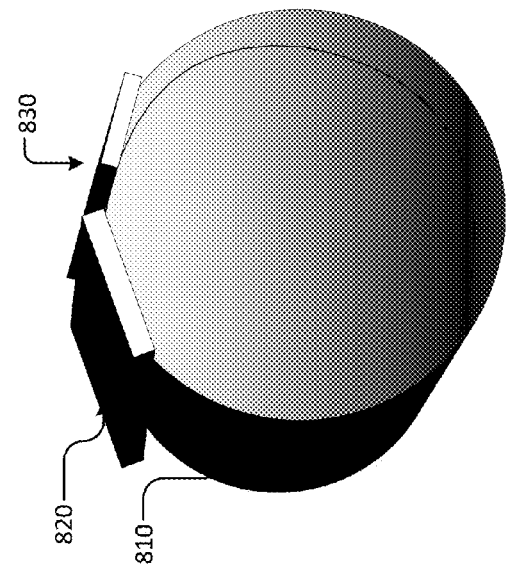
FIG. 8C illustrates a wearable biometric authentication device in another example orientation consistent with embodiments disclosed herein.

Referring to FIG. 7, a wearable biometric device 700 may include mobile device 720, biometric camera 730, and band 710. Mobile device 720 and biometric camera 730 may be comfortably mounted on band 710. Band 710 may comprise leather, silicone, rubber, plastic, metal chain links, or other materials known in the art and sufficient to be comfortable to a user. Band 710 may be configured to be worn on a wrist, arm, leg, ankle, neck, head, or other part of the human anatomy. Biometric camera 730 may be positioned such that, when band 710 is placed over a particular human anatomy (e.g. a wrist), biometric camera 730 is aimed at a sufficiently complex region of vasculature to capture enough of a vasculature pattern for unique identification (e.g. enough match points are captured in the vascular map to enable registration with a previously acquired image above a threshold number of match points). Biometric camera 730 may be a digital camera consistent with the example digital cameras disclosed in FIGS. 2-6 and mobile device 720 may be a smart watch configured to receive and process image and/or vascular map data sent by biometric camera 730, as well as transmit that data, or authentication true signals, to a security access device or security server, for example, such as that disclosed in FIG. 1.

FIGS. 8A, 8B, 8C, and 8D illustrate example wearable biometric authentication devices, where biometric camera 830 may be configured in varying locations on band 810. These locations are merely illustrative examples and are not meant to be limiting in any way. That is, a biometric camera, as utilized and described herein, may be positioned in any orientation on a wearable or otherwise attachable band as would be known or could be contemplated in the art, and useful for collection of vascular map image data.

Figure 9:
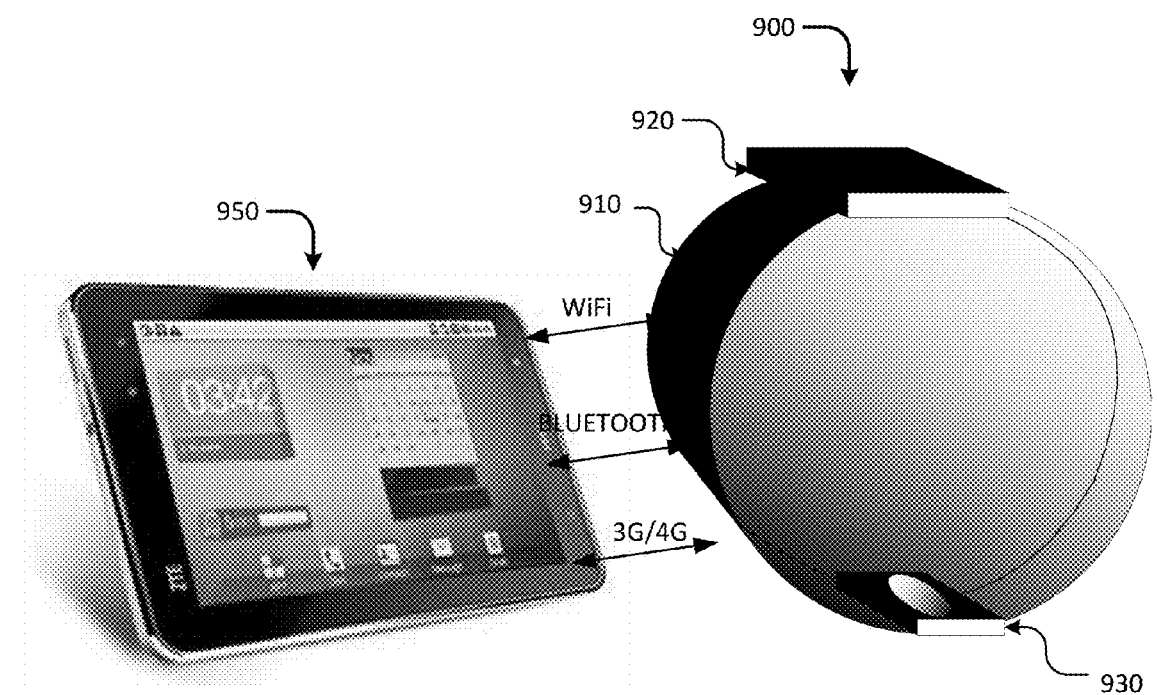
FIG. 9 illustrates an example wearable biometric authentication system consistent with embodiments disclosed herein.

FIG. 9 illustrates an example wearable biometric authentication system. A wearable biometric authentication system may include a wearable biometric device 900 and a mobile device 950. For example, the smart device may be a tablet computer, a mobile phone, a laptop computer, or other mobile devices as known in the art. Wearable biometric device 900 may communicate with mobile device 950 using known wireless communication mechanisms such as Bluetooth®, Wi-Fi, 3G/4G, or other known wireless communication protocols.

Figure 10:
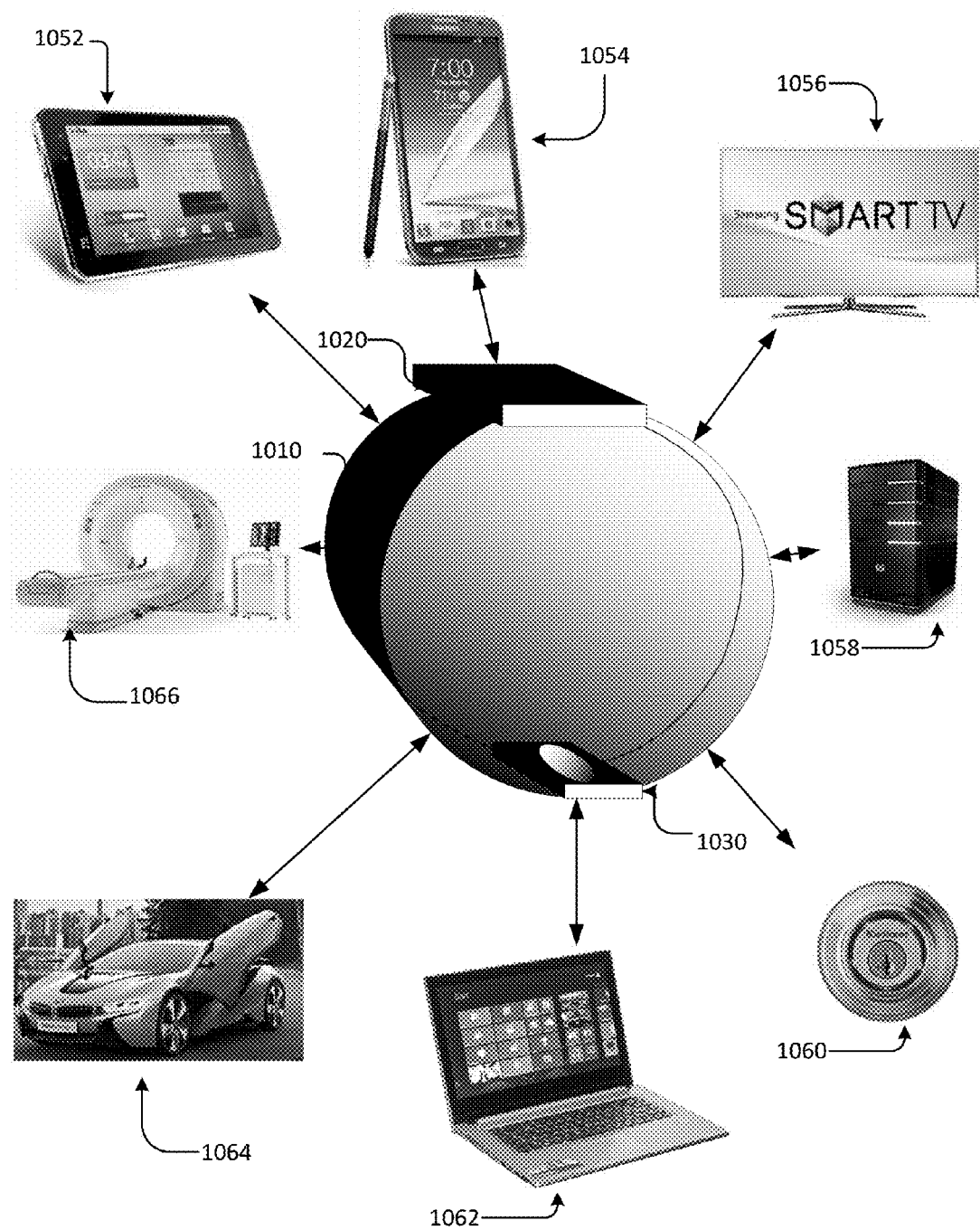
FIG. 10 illustrates multiple example wearable biometric authentication systems consistent with embodiments disclosed herein.

FIG. 10 illustrate example wearable biometric authentication systems wherein data processing steps, such as deriving a vascular map from a digital image, storing the vascular map, and comparing vascular maps using pattern recognition algorithms, are performed by various computing devices, and transmitted to various security access systems. For example, referring to FIG. 10, biometric camera 1030 and/or mobile device 1020 may be configured to transmit vascular map data to tablet 1052, mobile phone 1054, computer/server 1058, or laptop 1062. Alternatively, mobile device 1020 may perform a pattern matching authentication process and send an authentication true signal to example security access devices: tablet 1052; smart phone 1054; smart TV 1056; computer 1058; physical locking mechanism 1060; laptop 1062; automobile 1064; medical imaging device 1066; and/or a universal locking system (e.g. a master security system that controls a plurality of locks). The wearable vascular mapping authentication device may be further configured to integrate with other known security access systems configured to receive an electronic authentication signal. In each of the examples disclosed above, both image data and authentication signals may be transmitted via standard wireless communication protocols such as Bluetooth®, Wi-Fi, 3G/4G, or other known wireless communication protocols.

Some embodiments of the disclosure provide a method for vascular mapping authentication. As disclosed herein, a method for vascular mapping authentication may include storing a first vascular map and acquiring a live vascular images. The method for vascular mapping authentication may further include processing the live vascular images to create a second vascular map. The method for vascular mapping authentication may further include retrieving the first vascular map, causing a pattern matching engine to compare the first vascular map with the second vascular map, and returning an authentication true signal if the first vascular map matches the second vascular map.

FIG. 11 illustrates an example full body human vasculature map with a blow up detail of a wrist and hand section of the human vasculature map. As illustrated by FIG. 11, human vasculature forms complex patterns of veins and arteries. These complex patterns—particular those patterns near human extremities—are unique to individuals and can be used to uniquely identify an individual. For example, the example complex patterns in human vasculature near the surface of human skin may be imaged using the systems and methods disclosed herein and compared with stored images of the same vasculature to uniquely identify, or authenticate, a particular individual.

Figure 12:
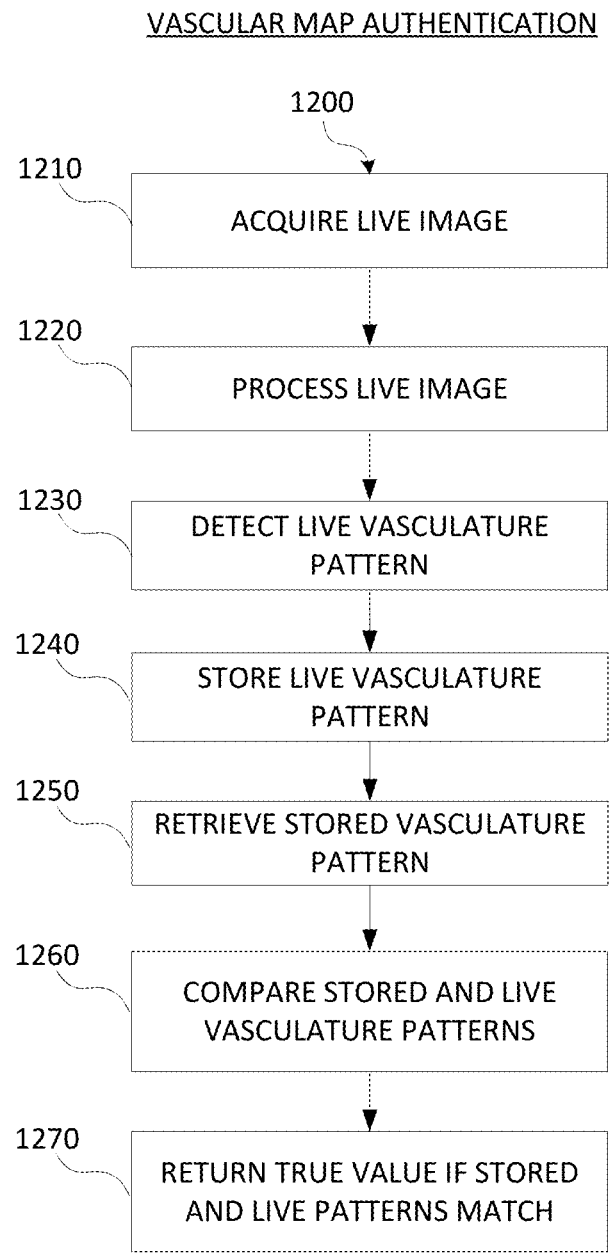
FIG. 12 is a process diagram illustrating a method for vascular mapping authentication consistent with embodiments disclosed herein.

FIG. 12 is a process diagram illustrating a method for vascular mapping. Referring to FIG. 12, an example method for vascular map authentication 1200 includes acquiring one or more live images at step 1210, processing the live images at step 1220, detecting a live vasculature pattern at step 1230, and storing the live vasculature pattern at step 1240. The method for vascular map authentication 1200 may further include retrieving the stored vasculature pattern at step 1250, comparing the stored and live vasculature patterns at step 1260, and returning an authentication true signal if the stored and live vasculature patterns match at step 1270. In some embodiments, the acquiring the one or more live images at step 1210 is accomplished using a digital camera or biometric camera as disclosed in FIGS. 1-11. In many of these embodiments, the digital camera is configured to capture images using infrared wavelengths, or NIR wavelengths, such that the digital camera is sensitive to blood in the human vasculature below the surface of the skin. In many such embodiments, the digital camera may further be configured to distinguish between wavelengths of light energy reflected from oxygenated blood as opposed to non-oxygenated blood to further distinguish between the arterial and venous components of the vascular map, as well as to distinguish between unique pulse patterns. For example, the parameters of vessel type (artery vs. vein) and pulse patterns or speed may be incorporated by the pattern matching engine to increase sensitivity and specificity of vascular pattern matching.

Still referring to FIG. 12, the processing of the live images 1220, detection of the live vasculature pattern 1230, and storing of the live vasculature pattern 1240 may be accomplished with computer readable media programmed with imaging processing applications or computer programs configured to analyze digital image data, identify and extract patterns, and store patterns on data storage media (e.g. solid state storage, optical storage, or magnetic storage media). Similarly, retrieving the stored vasculature pattern 1250, comparing the stored and live vasculature patterns 1260, and returning an authentication true value if the stored and live patterns match may be accomplished with computer readable media programmed with image processing applications or computer programs. The image processing applications or computer programs may be configured to process digital images and digital patterns, register the patterns against pre-determined regions of interest, and compare image data registered at those regions of interest between image sets to determine if a match point is achieved. If a match point is achieved, the image processing applications or computer programs may be further configured to store the match point and determine when a threshold number of match points has been reached, based on a predetermined threshold setting, to return an authentication true signal.

Figure 13:
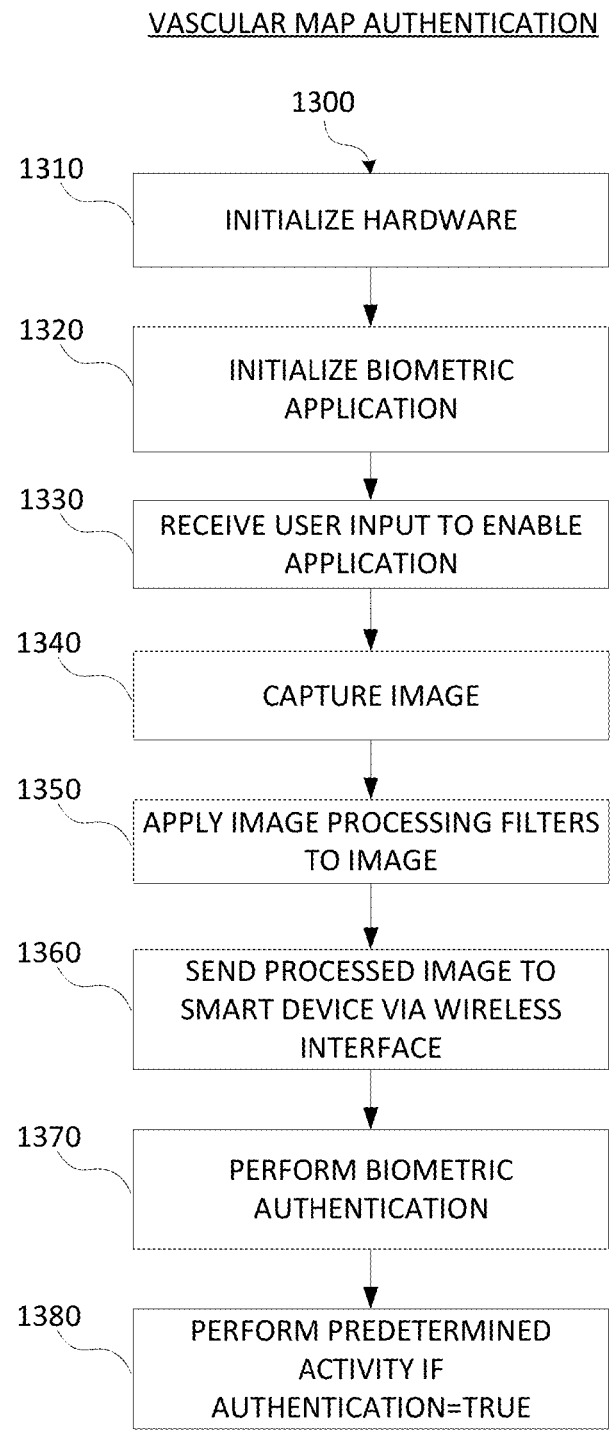
FIG. 13 is a process diagram illustrating a method for vascular mapping authentication using a biometric application consistent with embodiments disclosed herein.

FIG. 13 is a process diagram illustrating a method for vascular mapping authentication using a biometric application. For example, a method for vascular mapping authentication 1300 may use a biometric authentication device as disclosed in FIG. 1 and includes initializing the hardware at step 1310, initializing the a biometric application embedded on computer readable media on the biometric device at step 1320, receiving user input to enable the biometric application at step 1330, capturing an image with a digital camera embedded on the biometric authentication device at step 1340, applying image processing filters to the image at step 1350, sending the processed image to a smart device via a wireless interface at step 1360, performing biometric authentication at step 1370, and performing a predetermined activity if an authentication true signal is returned at step 1380. For example, the biometric authentication 1370 may be consistent with the vascular map authentication 1200 disclosed in FIG. 12, and the performing a predetermined activity 1380 may include enabling access to a computer system or mobile device, unlocking a physical lock, disabling an alarm, starting a car, enabling access to a file or website, or any other known security access process that may be enabled electronically.

Figure 14:
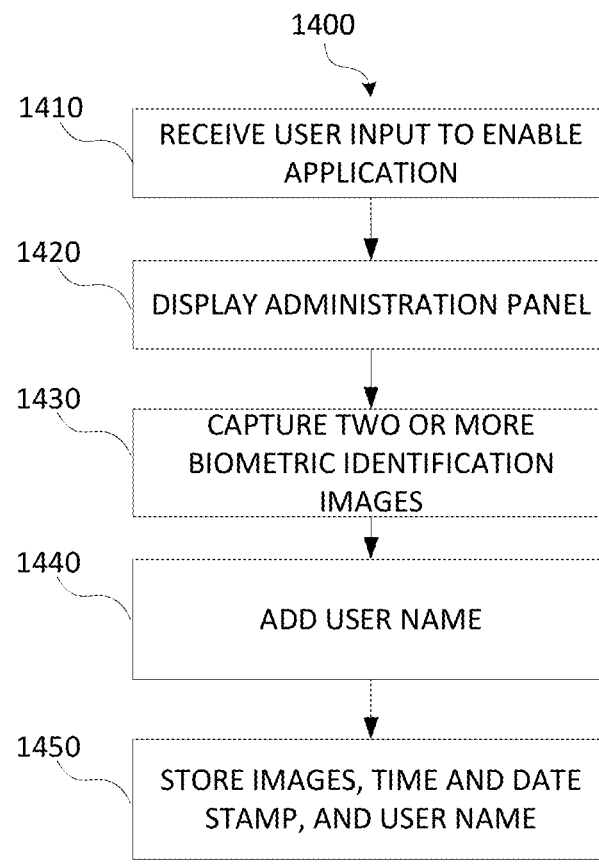
FIG. 14 is a process diagram illustrating a user registration process using biometric identification consistent with embodiments disclosed herein.

Referring to FIG. 14 a user registration process using biometric identification 1400 includes receiving user input to enable a biometric authentication protocol 1410 (e.g. the biometric authentication methods disclosed in FIGS. 12 and 13), displaying an administration panel at step 1420, capturing two or more biometric identification images at step 1430, adding a desired user name to register at step 1440, and storing the images, user name, and other relevant parameters in an authentication access control list at step 1450. The authentication access control list may be consistent with known access control list mechanisms and protocols (e.g. Radius, LDAP, etc), or may be unique or proprietary access control list mechanisms for a particular security access system.

Figure 15:
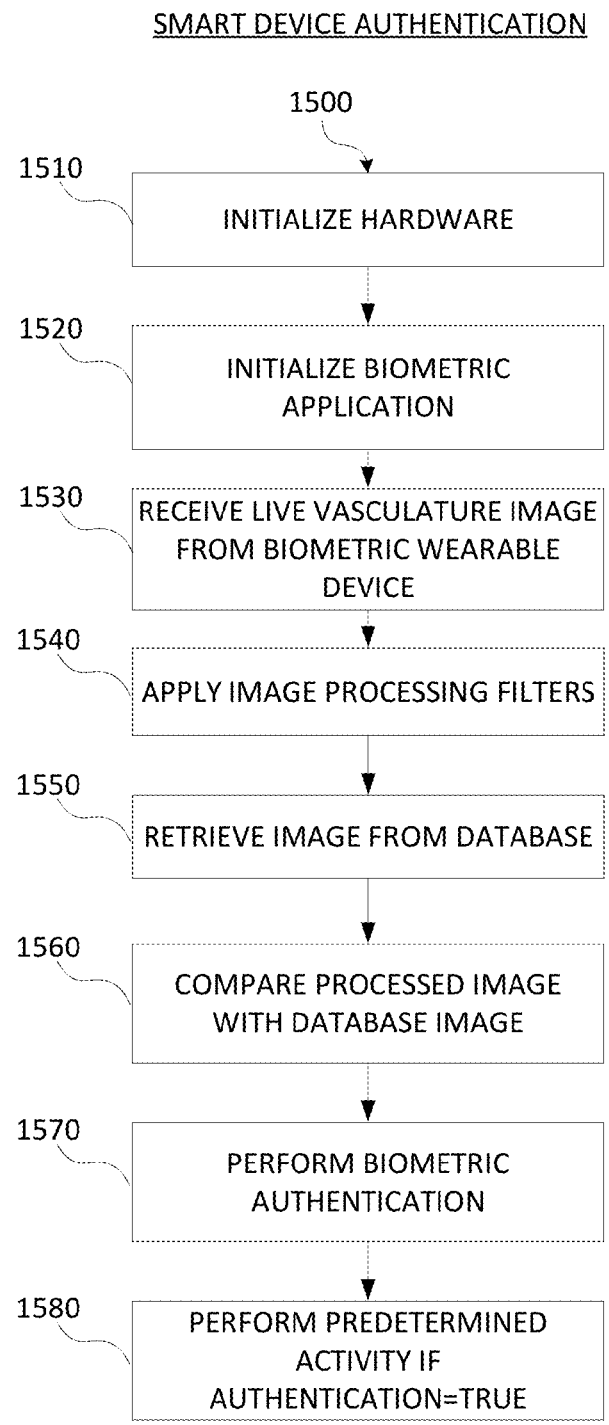
FIG. 15 is a process diagram illustrating a smart device authentication process using biometric identification consistent with embodiments disclosed herein.

Referring to FIG. 15, a method for smart device authentication 1500 includes initializing hardware at step 1510, initializing a biometric authentication application at step 1520 (e.g. the biometric authentication method disclosed in FIGS. 12 and 13), receiving one or more live images of vasculature from a biometric wearable device at step 1530 (e.g. the biometric wearable device disclosed in FIGS. 7-9), applying image processing filters at step 1540, retrieving stored images of vasculature from a database at step 1550, comparing the processed live images of vasculature with the stored images of vasculature at step 1560, performing biometric authentication at step 1570, and performing a predetermined action if an authentication true signal is returned at step 1580. For example, the biometric authentication 1570 may be consistent with the vascular map authentication 1200 disclosed in FIG. 12, and the performing a predetermined activity 1580 may include enabling access to a computer system or mobile device, unlocking a physical lock, disabling an alarm, starting a car, enabling access to a file or website, or any other known security access process that may be enabled electronically.

Figure 16:
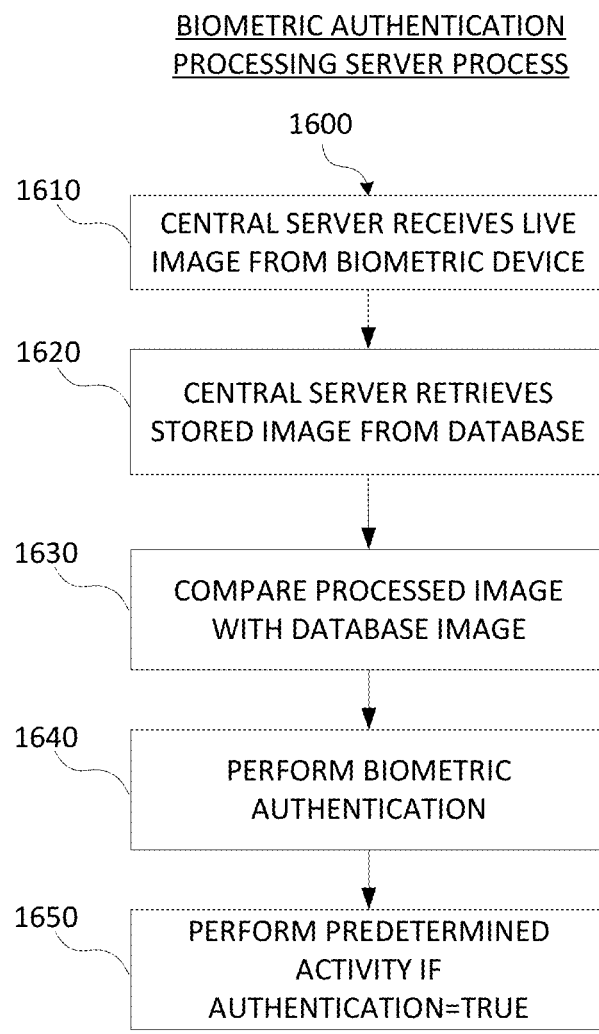
FIG. 16 is a process diagram illustrating a server based biometric authentication process consistent with embodiments disclosed herein.

Referring to FIG. 16, a method for biometric authentication using a processing server 1600 includes receiving, with a central server, live images from a biometric authentication device at step 1610 (e.g. a biometric authentication device as disclosed in FIGS. 1-11), retrieving, with a central server, stored vascular map images from a database at step 1620, comparing the live images with the stored vascular map images at step 1630, performing biometric authentication at step 1640, and performing a predetermined action if an authentication true signal is returned at step 1650. For example, the biometric authentication 1640 may be consistent with the vascular map authentication 1200 disclosed in FIG. 12, and the performing a predetermined activity 1650 may include enabling access to a computer system or mobile device, unlocking a physical lock, disabling an alarm, starting a car, enabling access to a file or website, or any other known security access process that may be enabled electronically.

Figure 17:
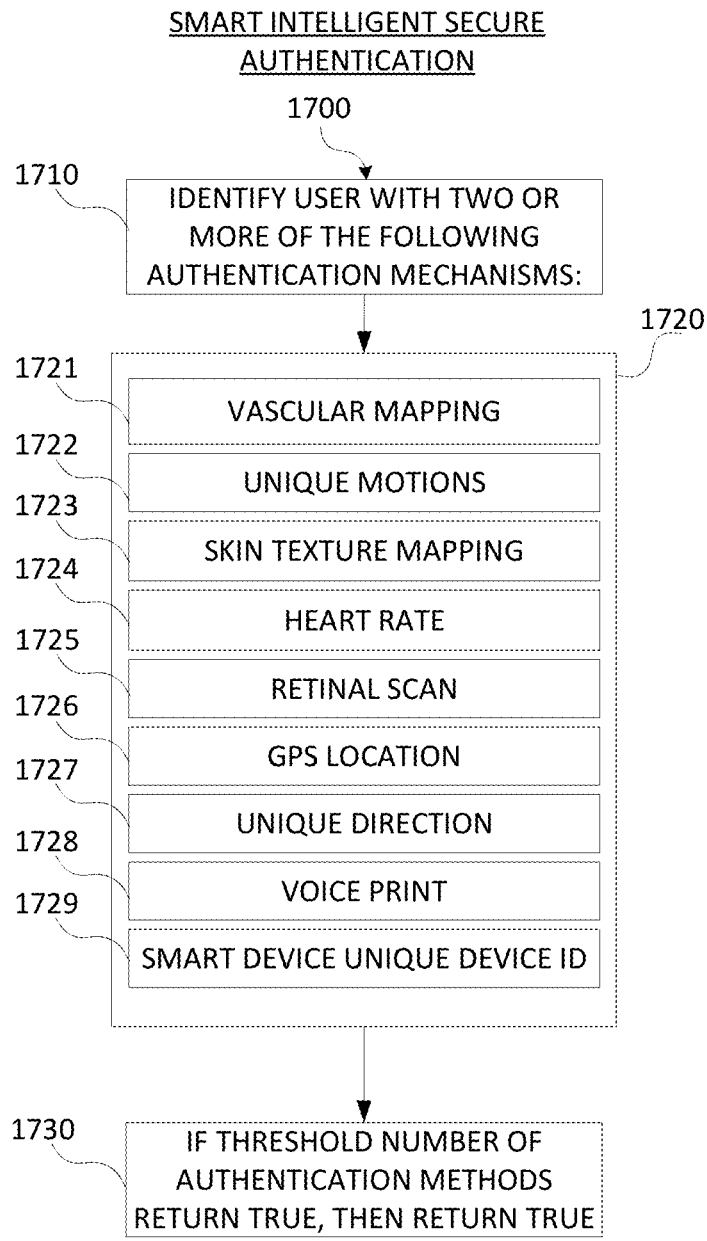
FIG. 17 is a process diagram illustrating a multi-step biometric authentication process consistent with embodiments disclosed herein.

Referring to FIG. 17, an intelligent secure authentication method may include multiple authentication steps, including a biometric authentication step, such that all authentication steps return an authentication true result to properly authenticate a user. For example, a method for intelligent secure authentication 1700 includes identifying a user with two or more authentication mechanisms at step 1710, wherein the authentication mechanisms may be vascular mapping authentication 1721, unique motion identification authentication 1722, skin texture mapping authentication 1723, heart rate authentication 1724, retinal authentication 1725, GPS location authentication 1726, unique direction via a compass authentication 1727, voice print authentication 1728, smart device unique device ID authentication 1729, or any other known authentication mechanism, including standard password authentication. Then, if a threshold number of authentication methods return an authentication true signal, then the user is authenticated at step 1730.

Figure 18:
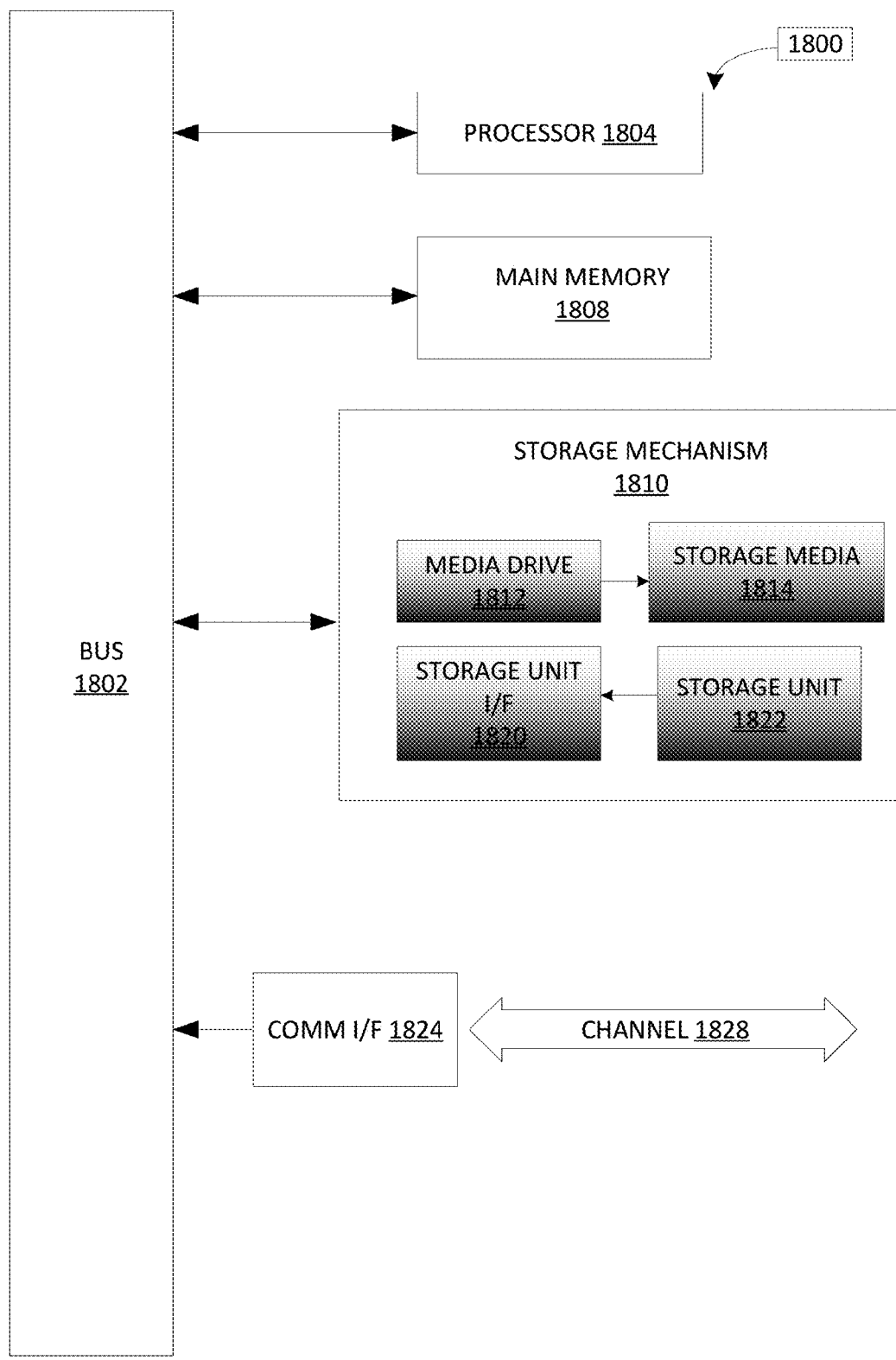
FIG. 18 illustrates an example computing module that may be used to implement various features of the systems and methods disclosed herein.

FIG. 18 illustrates an example computing module that may be used to implement various features of the systems and methods disclosed herein. In one embodiment, the computing module includes a processor and a set of computer programs residing on the processor. The set of computer programs may be stored on a non-transitory computer readable medium having computer executable program code embodied thereon. The computer executable code may be configured to receive a live vascular image, process the live vascular image to calculate a vascular map, retrieve a stored vascular map, compare the live and stored vascular maps to determine if the vascular maps are from the same user, and if the vascular maps are from the same user, authenticate that user.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 18. Various embodiments are described in terms of this example-computing module 1800. After reading this description, it will become apparent to a person skilled in the relevant art how to implement the application using other computing modules or architectures.

Referring now to FIG. 18, computing module 1800 may represent, for example, computing or processing capabilities found within desktop, laptop, notebook, and tablet computers; hand-held computing devices (tablets, PDA's, smart phones, cell phones, palmtops, smart-watches, smart-glasses etc.); mainframes, supercomputers, workstations or servers; or any other type of special-purpose or general-purpose computing devices as may be desirable or appropriate for a given application or environment. Computing module 1800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1800 might include, for example, one or more processors, controllers, control modules, or other processing devices, such as a processor 1804. Processor 1804 might be implemented using a general-purpose or special-purpose processing engine such as, for example, a microprocessor, controller, or other control logic. In the illustrated example, processor 1804 is connected to a bus 1802, although any communication medium can be used to facilitate interaction with other components of computing module 1800 or to communicate externally.

Computing module 1800 might also include one or more memory modules, simply referred to herein as main memory 1808. For example, preferably random access memory (RAM) or other dynamic memory, might be used for storing information and instructions to be executed by processor 1804. Main memory 1808 might also be used for storing temporary variables or other intermediate information during execution of instructions to be executed by processor 1804. Computing module 1800 might likewise include a read only memory ("ROM") or other static storage device coupled to bus 1802 for storing static information and instructions for processor 1804.

The computing module 1800 might also include one or more various forms of information storage mechanism 1810, which might include, for example, a media drive 1812 and a storage unit interface 1820. The media drive 1812 might include a drive or other mechanism to support fixed or removable storage media 1814. For example, a hard disk drive, a solid state drive, a magnetic tape drive, an optical disk drive, a CD or DVD drive (R or RW), or other removable or fixed media drive might be provided. Accordingly, storage media 1514 might include, for example, a hard disk, a solid state drive, magnetic tape, cartridge, optical disk, a CD or DVD, or other fixed or removable medium that is read by, written to or accessed by media drive 1812. As these examples illustrate, the storage media 1814 can include a computer usable storage medium having stored therein computer software or data.

In alternative embodiments, information storage mechanism 1810 might include other similar instrumentalities for allowing computer programs or other instructions or data to be loaded into computing module 1800. Such instrumentalities might include, for example, a fixed or removable storage unit 1822 and a storage interface 1820. Examples of such storage units 1822 and storage interfaces 1820 can include a program cartridge and cartridge interface, a removable memory (for example, a flash memory or other removable memory module) and memory slot, a PCMCIA slot and card, and other fixed or removable storage units 1822 and storage interfaces 1820 that allow software and data to be transferred from the storage unit 1822 to computing module 1800.

Computing module 1800 might also include a communications interface 1824. Communications interface 1824 might be used to allow software and data to be transferred between computing module 1800 and external devices. Examples of communications interface 1824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1824 might typically be carried on signals, which can be electronic, electromagnetic (which includes optical) or other signals capable of being exchanged by a given communications interface 1824. These signals might be provided to communications interface 1824 via a channel 1828. This channel 1828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1808, storage unit 1820, media 1814, and channel 1828. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing module 1800 to perform features or functions of the present application as discussed herein.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A wearable system for vascular mapping authentication comprising:
   a wearable band;
   a biometric device physically coupled to the wearable band, the biometric device comprising a digital image sensor configured to capture one or more images of human vasculature, wherein the digital image sensor is disposed on a surface of the biometric device, such that the digital image sensor faces towards an anatomical structure when the wearable band is wrapped around the anatomical structure; and
   a mobile device physically coupled to the wearable band, the mobile device comprising:
      a wireless transmitter;
      a processor; and
      a non-transitory computer-readable medium operatively coupled to the processor and having instructions stored thereon that, when executed by the processor, cause the mobile device to:
         receive the one or more images of the human vasculature from the biometric device;
         retrieve a first vascular map from a database;
         generate a second vascular map from the one or more images;
         compare the first vascular map with the second vascular map using a pattern matching engine; and transmit, using the wireless transmitter, an authentication true signal to a security access device if the pattern matching engine determines that the patterns match.

2. The system of claim 1, wherein the wearable band is worn around a human wrist, ankle, or neck.

3. The system of claim 1, wherein the security access device is a security server.

4. The system of claim 1, wherein the security access device is a second mobile device.

5. The system of claim 1, wherein the digital image sensor is sensitive to infrared electromagnetic radiation.

6. The system of claim 1, wherein the digital image sensor is sensitive to electromagnetic radiation having a wavelength between 700 nm and 900 nm.

7. The system of claim 1, further comprising an electromagnetic radiation device coupled to the biometric sensor.

8. The system of claim 7, wherein the electromagnetic radiation device comprises an LED flash configured to emit electromagnetic radiation when the digital image sensor captures the one or more images.

9. The system of claim 8, wherein the LED flash emits electromagnetic radiation with a wavelength of between 700 nm and 900 nm.

10. A biometric authentication method, comprising:
   acquiring, with a biometric sensor, one or more images of a cutaneous surface;
   retrieving a first vascular map from a database;
   generating a second vascular map from the one or more images;
   generating, with a pattern matching engine, a match probability score based on the probability that the first vascular map matches the second vascular map, wherein generating a match probability score comprises:
     identifying a predetermined number of match points within the first vascular map,
     comparing each of the predetermined number of match points within the first vascular map to a match point within the second vascular map; identifying, for each of the predetermined number of match points within the first vascular map, that a successful match exists if the match point within the first vascular map matches the compared match point within the second vascular map; and
     determining the match probability score based on the number of successful matches; and
   transmitting an authentication true signal to a security access device if the matching probability score exceeds a threshold value.

11. The method of claim 10, wherein the acquiring one or more images further comprises illuminating, with an electromagnetic radiation device, the cutaneous surface.

12. The method of claim 10, further comprising performing a predetermined activity based on the authentication true signal.

13. The method of claim 12, wherein the predetermined activity is accessing a computer, unlocking a physical lock, disabling an alarm, starting a car, enabling access to a file, or enabling access to a website.

14. The method of claim 10, further comprising applying image processing filters to the one or more images.

15. The method of claim 14, wherein the image processing filters comprise an ultraviolet filter or a polarizing filter.

16. An enhanced biometric authentication method, comprising:
   applying a first authentication process and a second authentication process, wherein the first authentication process comprises a wearable authentication device performing the operations of:
     acquiring, with a digital image sensor of the wearable authentication device, one or more images of a cutaneous surface, wherein the digital image sensor is disposed on a surface of the wearable authentication device such that the digital image sensor faces the cutaneous surface when the wearable authentication device is worn;
     retrieving a first vascular map from a database;
     generating a second vascular map from the one or more images; and
     generating, with a pattern matching engine, a match probability score based on the probability that the first vascular map matches the second vascular map; and
   the second authentication process comprises performing a unique motion identification process, a skin texture mapping process, a retinal scanning process, a GPS location process, a voice print recognition process, a password authentication process, or a smart device unique identification process; and
   transmitting an enhanced authentication true signal to a security access device if the match probability score exceeds a threshold value and the second authentication process is successful.

\* \* \* \* \*